United States Patent
Weedlun

(10) Patent No.: US 8,377,246 B2
(45) Date of Patent: Feb. 19, 2013

(54) APPLIQUÉ, HAVING DUAL COLOR EFFECT BY LASER ENGRAVING

(76) Inventor: Paul Weedlun, Fulton, MD (US)

(*) Notice: Subject to any disclaimer, the term of this patent is extended or adjusted under 35 U.S.C. 154(b) by 353 days.

(21) Appl. No.: 12/589,256

(22) Filed: Oct. 20, 2009

(65) Prior Publication Data
US 2011/0008618 A1    Jan. 13, 2011

Related U.S. Application Data

(60) Provisional application No. 61/196,757, filed on Oct. 20, 2008.

(51) Int. Cl.
*B32B 37/00* (2006.01)
*B32B 37/02* (2006.01)
*B32B 38/00* (2006.01)
*B32B 38/04* (2006.01)
*B32B 38/10* (2006.01)

(52) U.S. Cl. ......... 156/253; 156/250; 156/252; 156/256

(58) Field of Classification Search .................. 156/250, 156/252, 253, 256
See application file for complete search history.

(56) References Cited

U.S. PATENT DOCUMENTS

| | | | |
|---|---|---|---|
| 5,009,943 A | 4/1991 | Stahl | |
| 5,567,207 A * | 10/1996 | Lockman et al. | 8/444 |
| 5,635,001 A | 6/1997 | Mahn, Jr. | |
| 5,695,600 A * | 12/1997 | Goin | 156/758 |
| 5,914,176 A | 6/1999 | Myers | |
| 6,007,929 A | 12/1999 | Robertson | |
| 6,110,558 A * | 8/2000 | Billingsley et al. | 428/67 |
| 6,875,395 B2 * | 4/2005 | Kisha et al. | 264/482 |
| 7,065,820 B2 * | 6/2006 | Meschter | 12/146 C |
| 2008/0310747 A1 * | 12/2008 | Anderson | 382/249 |

FOREIGN PATENT DOCUMENTS

WO    WO9508419    3/1995

* cited by examiner

*Primary Examiner* — Philip Tucker
*Assistant Examiner* — Christopher C Caillouet
(74) *Attorney, Agent, or Firm* — Ober, Kaler, Grimes & Shriver; Royal W. Craig

(57) ABSTRACT

A product and process for producing heat-transfers having a contrasting-color 3D appearance comprising a printed layer of woven fabric substrate adhered to a colorfast textile substrate. The woven fabric substrate includes a top substrate printed with a design logo. The underlying substrate is a solid color. The design logo/is engraved away in patterned designs using a galvanometric laser to reveal the contrasting substrate in desired areas, giving a layered embroidery 3D visual effect. These heat activated appliqués of the present invention are particularly suitable for use in forming decorations for apparel, bags and home furnishings. Their soft tactile hand feel does not cause discomfort to the wearer. The resulting product has superior care and durability characteristics, is more wash fast and can be ironed, and has superior appearance characteristics to other types of heat transfer appliqués. The heat transfer capability of the appliquéallows for fast customization of finished garments.

6 Claims, 2 Drawing Sheets

APPLIQUÉ, HAVING DUAL COLOR EFFECT BY LASER ENGRAVING

CROSS-REFERENCE TO RELATED APPLICATIONS

This application derives priority from U.S. provisional application No. 61/196,757 filed, 20 Oct. 2008.

BACKGROUND OF THE INVENTION

1. Field of the Invention

The present invention relates to heat activated transfers and appliqués that are used to apply a variety of different indicia onto a variety of different substrates. The particular indicia has a contrasting two-color effect achieved by laser engraving, and can be used for decorative appliqué text, logo graphics, numbers or other indicia.

2. Description of the Background

Fashion, "basic" and performance apparel, uniform, swimwear and intimate apparel and accessory manufacturers use various methods to apply decoration and identification to stretchable garments and textiles. They tend to use silk-screening, screen-printing, sonic welding, direct embroidery and heat activated transfers as their primary methods for decorating and identification.

Silk-screening of logos or emblems is commonly used, but this process does not result in a product that withstands repeated stretching, and is complex and time-consuming. In addition, the designs created by silk-screening are flat, lack texture, and do not withstand repeated stretching or industrial or home washings. Consequently, many companies prefer embroidery as their primary method for applying decoration and identification.

Sonic welding is another method used to apply decoration and identification to garments and textiles. This process requires the creation of unique, expensive special dies for any design to be applied. The quick-change requirements associated with the performance apparel industry make this process slow and relatively expensive. Sonic welding allows texturing, but also requires chemical compounds that some companies find unacceptable, and that can result in a product that does not stand stretching or repeated home and industrial laundering. Indeed, this process typically is not used by the uniform industry for these reasons. Embroidery has instead become the primary method for applying decoration and identification.

Embroidery is typically performed by a machine that applies stitching of various colors and styles to fabric to create a design. Embroidered designs have a much greater aesthetic value, and stands repeated home and industrial launderings. Yet this too is a complex, time-consuming process.

There have been a few attempts at providing a textile appliqué with a three dimensional appearance without utilizing embroidery. U.S. Pat. No. 5,009,943 to Stahl discloses a method for producing a multi-colored emblem that may be ironed-on to garments to provide an embroidered appearance. This method entails laminating a material blank, cutting the laminated material to a specific design, embroidering about the periphery of the cut design, laminating the assembly onto a second material blank, and coating the underside with a thermal adhesive layer. The emblem can then be heat-sealed to a garment. Despite the ability to give a realistic embroidered look, emblems produced using Stahls' method are relatively large, bulky and inflexible.

There are other transfer emblems that may be applied to various cloth surfaces without embroidery. For example, U.S. Pat. No. 5,635,001 to Mahn, Jr. issued Jun. 3, 1997 shows cloth transfers that include a cloth layer coated with a plastic layer which is, in turn, coated with a pressure sensitive adhesive layer.

U.S. Pat. No. 5,914,176 to Myers issued Jun. 22, 1999 shows a composite design for attachment to another fabric article, comprising an underlying layer of twill fabric on one side of which an design is printed and heat cured. The twill is cut into a desired shape so that the twill and the ink portion form the composite design. Methods of making and attaching the composite design are disclosed.

It is known to deboss such appliqués to provide surface characteristics. These surface characteristics can increase the embroidery-likeness by simulating stitching, fabric weave, etc. PCT (International) Application No. WO9508419 by Mahn, John (Specialty Adhesives) published Mar. 30, 1995 shows a heat activated applique (11) for providing in particular numbers and letters for sports jerseys including an upper colored thermoplastic elastomer layer (14) bonded to a cloth substrate (15) by a thermoplastic adhesive (12). The thermoplastic elastomer layer (14) is debossed to provide surface characteristics. However, this kind of debossing does not alter color characteristics.

U.S. Pat. No. 6,007,929 to Robertson et al. issued Dec. 28, 1999 shows selective laser ablasion of an article that has been painted with two contrasting coats of paint, a topcoat and a basecoat. The topcoat, while still wet, can be ablated by the beam of a laser while the basecoat, while wet, dry or tacky, is refractory to the beam of the laser. The laser, thus, can generate alphanumeric and graphic characters (product identification indicia) on the workpiece by ablating the topcoat to reveal the basecoat to generate the characters by dint of the visible contrast between the two coats of paint. Robertson is focused on a base coat and a top coat of paint that are sequentially processed, and then laser ablation to remove the top coat and reveals the bottom coat of paint.

Laser etching produces a pattern or design on a material by eating into the material's surface. Laser etching is the practice of using lasers to engrave or mark an object to cut figures, letters, or designs. It would be desirable to use a laser-engraving concept that attaches a pre-printed textile surface layer to a substrate layer, followed by laser-engraving of the surface layer exposing the underlying substrate layer to produce a three-dimensional effect on a textile appliqué.

SUMMARY OF THE INVENTION

It is, therefore, the primary object of the present invention to provide a novel heat-activated appliqué bearing text, numbers, logos and other indicia for the uniform and other industries that serves as an embroidery, thermo-transfer films, silk screen or sublimated printing replacement in giving a dimensional multi-layered appearance comprising an upper, stretchable fabric layer bonded to a cloth substrate by a thermoplastic adhesive.

It is another object to provide an appliqué formed with a woven or non-woven fabric substrate printed with a design logo, and attached to an underlying solid colored substrate, and in which the design logo is engraved away in patterned designs using a galvanometric laser to reveal the contrasting substrate in desired areas, giving a layered embroidery 3D visual effect.

In accordance with these and other objects, the present invention is a product and process for producing embroidery transfers having a contrasting-color 3D appearance comprising a layer of woven fabric substrate adhered to an underlying substrate. The woven fabric substrate includes a top substrate printed with a design logo. The underlying substrate is a solid colored substrate. The design logo/is engraved away in patterned designs using a galvanometric laser to reveal the contrasting underlying substrate in desired areas, giving a layered 3D visual effect. These heat activated appliqués of the present invention are particularly suitable for use in forming decorations for apparel, bags and home furnishings. Their soft tactile hand feel does not cause discomfort to the wearer.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a heat-activated (thermal) appliqué bearing a printed design element having colors, characters and/or other design elements formed by printing through either sublimation, direct digital printing or screen printing. The appliqué comprises two layers: an upper textile layer and a lower base layer, the latter being a solid color. The print design is printed onto the upper layer. The upper textile layer is then etched through in select areas about the printed design to expose the colored base layer in those areas. The end result is a thermal appliqué bearing a multi-colored 3D appearance comprising the printed design element accentuated by the contrast-colored base layer which shows through. The appliqué gives a more realistic multi-layer embroidered emblem appearance. The process for production is also disclosed and includes the steps of taking an upper textile layer printed with a design, laminating it to a base layer with a thermal plastic film (or powdered dispersion coating) to adhere the two layers together. The color of the base layer is chosen with regard to the color(s) of the upper textile layer to contrast or accentuate those color(s). A laser is then used to selectively engrave through the upper textile layer to expose the base layer textile product.

Figure 1:
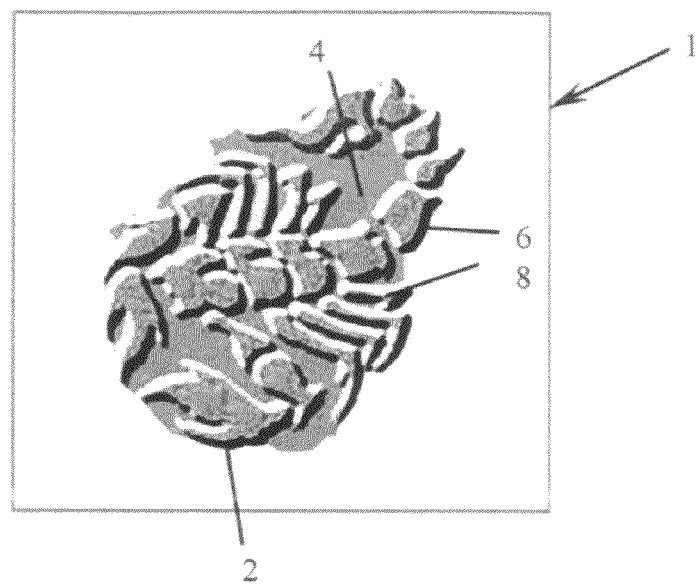
FIG. 1 is a front perspective view of a heat-activated appliqué 1 according to an embodiment of the present invention.

FIG. 1 is a front perspective view of a heat-activated appliqué 1 according to an embodiment of the present invention. The appliqué 1 portrays a design 2 (here a scorpion) in which light and dark highlights 6, 8 of the design are printed, and in which color-contrasting areas 4 are formed by laser engraving through a top printed layer to an underlying colored base layer.

Figure 2:
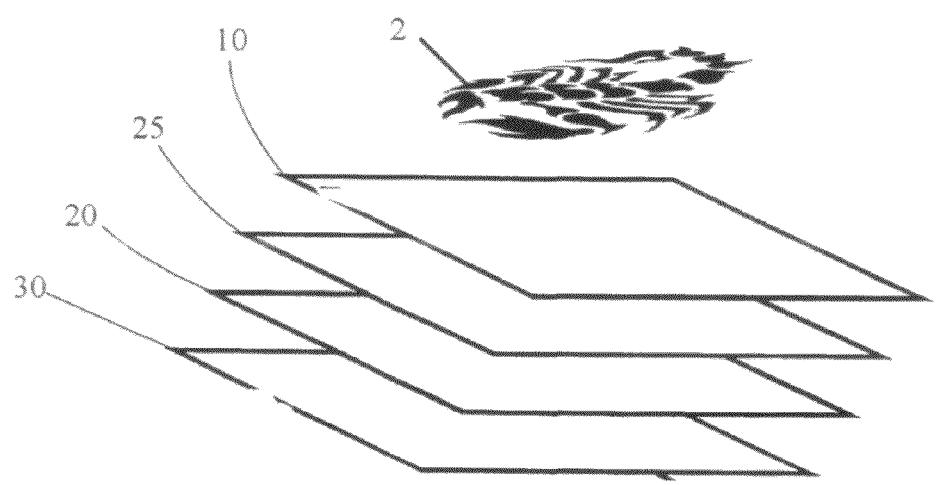
FIG. 2 is a side exploded view of the heat-activated appliqué 1 as in FIG. 1.

FIG. 2 is a side exploded view of the heat-activated appliqué 1 as in FIG. 1.

The upper textile layer 10 can be any woven or non-woven fabric or knit material, including matted, compressed fabrics such as felt. The upper textile layer 10 must be fibrous and wash durable, preferably but not necessarily woven, and sturdy enough to withstand repeated laundering inasmuch as the present appliqués are specifically intended for replacing appliqué or emblem designs on uniforms and the like.

A base layer 20 is attached beneath the upper textile layer 10, and base layer 20 may be any suitable textile fabric or plastic backing layer that provides added strength to the upper textile layer 10 as well as color contrast. The color of the base layer is chosen with regard to the color(s) of the upper textile layer to contrast or accentuate those color(s). In this regard, base layer 20 is uniformly colored throughout, and the color is chosen with specific regard to the color of the upper textile layer 10 and/or design element 2 printed thereon to provide an aesthetically pleasing color contrast.

A lower laminating layer 30 underlies the base layer 20 for laminating the appliqué 1 to a product. Laminating layer 30 comprises a compatible heat activated adhesive layer. Suitable thermoplastic adhesives for the present invention include urethane adhesives such as Bemis Sewfree 3206D urethane films produced by Bemis Associates Inc. or similar urethane films produced by Deerfield Urethanes Inc. Laminating layer 30 preferably has a hot melt point within a first range, preferably of from 175-300 degrees F.

The base layer 20 is registered to and attached to the upper textile layer 10 by a heat sensitive adhesive 25 layer comprising a substrate with thermoplastic material that is tacky at an elevated temperature substantially greater than the hot melt point range of the laminating layer 30, for example, above 300 degrees F.

Figure 3:
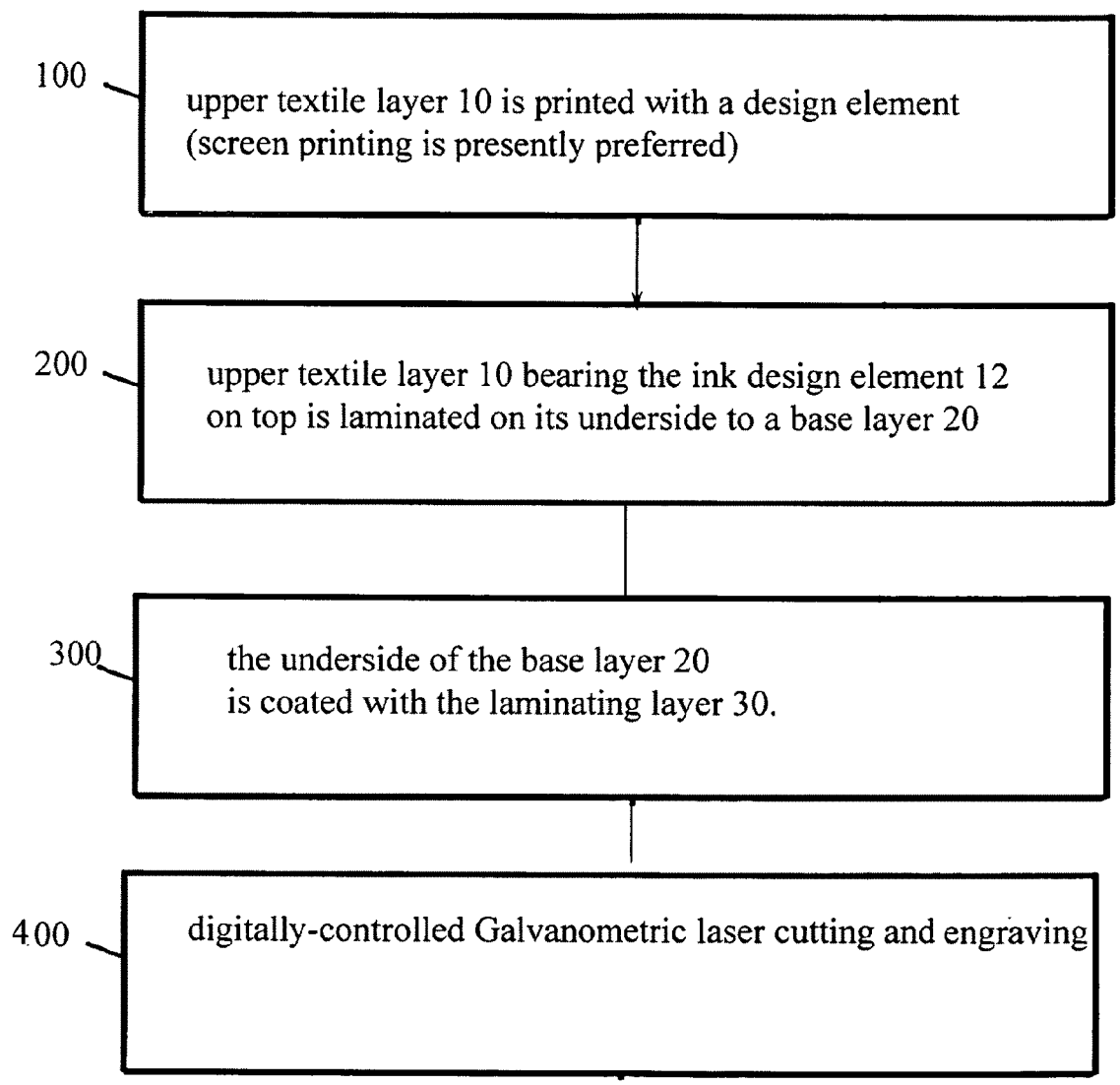
FIG. 3 is a flow chart illustrating the construction steps for manufacture of the heat-activated appliqué 2.

FIG. 3 is a flow chart illustrating the construction steps for manufacture of the heat-activated appliqué 2.

As seen in step 100, beginning with the upper textile layer 10, the upper textile layer 10 is printed with a design element 2. Sublimation printing is presently preferred. Sublimation printing is accomplished by a four color process where small droplets of cyan, magenta, yellow and black ink are deposited onto a transfer paper medium. The transfer paper is then heat-pressed or calendared to the upper textile layer to gasify the inks or dyes into the fibers. This method provides a dyed surface with no variance in hand feel to the fabric itself. An alternative method is to directly print onto the fabric using the four color process described above, followed by heat processing the fabric to gasify the dyes. This method has the similar advantages of sublimation, however, image quality maybe less clear due to color bleeding and the post printing processes can distort the fabric. An alternative process is screen printing which may be accomplished in a conventional manner by stretching a screen made of a piece of porous, finely woven fabric over a frame, blocking off areas of the screen with a non-permeable material to form a stencil, and filling the mesh openings with ink. The mesh is brought in contact with the upper textile layer 10 and a squeegee (rubber blade) is moved down the screen. The ink that is in the mesh opening is transferred by capillary action to the upper textile layer 10 in a controlled and prescribed amount, leaving the inked design element 2 upon the upper textile layer 10. The ink is allowed to dry. Conventional flat-bed, cylinder or rotary screen printing pressed may be used. In addition, multi-color designs may be printed using a wet-on-wet technique. In the embodiment shown in FIG. 1 the design element 2 is printed in black and white 6, 8, while the base layer 20 is uniformly gray.

Next, at step 200, the upper textile layer 10 bearing the ink design element 12 on top is heat-attached on its underside to the base layer 20 via the heat sensitive adhesive 25 layer to adhere the three layers 10, 20, 25 together. To do this, the upper textile layer 10 is sandwiched with the base layer 20 and an intermediate layer of heat sensitive adhesive 25 for heat sealing thereto, and lamination is effected. Flatbed laminating is preferred, and a suitable laminating machine is the Glenro HTH or HTM model flatbed laminator from Glenro Inc., 39 McBride Ave., Paterson, N.J. 07501-1799. These are PLC-controlled machines and the heat is set in accordance with the hot melt point range of the laminating layer 30, for example, 307 degrees F. This step adheres the base layer 20 to the upper textile layer 10. Lamination of a pressure sensitive adhesive can alternatively be used with application occurring by the use of pressure rolls or platens. The laminating phase can occur prior to the printing step 100 but with present technology image quality and wash durability would be compromised.

One skilled in the art will readily understand that the base layer 20 may be either a textile fabric (woven or non-woven) or a film laminate obtained in bulk roll form, printed in multiple areas, and fed with the upper textile layer 10 into a commercial laminating machine.

Next, at step 300, the underside of the base layer 20 is coated with the laminating layer 30.

Next, at step 400, the work piece comprising the above-combined layers 10, 20, 25 and 30 are transferred to a digitally-controlled Galvanometric movement laser cutting and engraving system in which variable-intensity laser beam is driven by a galvanometric system positioning system capable of high speed movement. For example, the cutting and engraving station may be an Atlanta FB-1500 Laser Cutting System manufactured by CADCAM Technologies, Inc. of Knottingham, England.

The cutting and engraving station includes an indexed cutting bed upon which the work piece is placed and having an X-Y plotter with articulating laser head thereon or a rastering laser that directs the laser beam by driving mirrors to direct the beam on the bed. The heat from the laser beam cuts and engraves selectively: 1) through the ink design element 2 and through the upper textile layer 10 but not the base layer 20 or laminating layer 30; and 2) through the ink design element 2, upper textile layer 10, base layer 20 and laminating layer 30.

The digitally-controlled Galvanometric movement laser cutting and engraving system is programmed to make two separate passes, a first in which it engraves through the ink design element 2 and through the upper textile layer 10 but not the base layer 20 or laminating layer 30, and a second in which it cuts the outer shape of the appliqué 1 but cutting entirely through the ink design element 2, upper textile layer 10, base layer 20 and laminating layer 30. In the first "engraving" pass, the laser simply vaporizes sections of the ink design element 2 and upper textile layer 10, but leaves the base layer 20 visible. This forms recessed sections 4 as in FIG. 1 in which the color-contrasting base layer 20 shows upward, adding contrast to the immediately surrounding ink design 2. During a typical engraving pass the laser will engrave an area using a pattern of closely-spaced parallel back-and-forth lines, and will then engrave the same area using a pattern of closely-spaced parallel cross-hatch lines intersecting the first lines, this cross-hatching laser pattern effectively vaporizing the ink design element 2 and upper textile layer 10, but leavings the base layer 20 underneath exposed.

In the second "cutting" pass, the laser cuts the periphery of the appliqué 1. Cutting may be guided by machine-vision reference marks laid down during printing of the appliqué 1 (described above).

Upon completion of cutting and engraving at step 400, the laser head returns to a point of origin, allowing the user to retrieve the appliqué 1. The waste portions are removed.

Once sent and unpackaged, the appliqué 1 may be thermally applied to a product in a conventional manner. Electrically heated platen presses are the most commonly used means of applying the adhesive coated appliqués 1 to garments or other articles. Temperature, pressure, and dwell time are the three basic seal conditions that must be controlled in order to ensure a proper bond. These three parameters should be established for each specific garment and embroidery combination. Generally, for the preferred embodiment illustrated above the temperature is held at approximately 250 deg F. (glueline temp at which laminating layer 30 will melt without melting adhesive layer 25), and this is sustained for 5-10 seconds once the temperature has been reached. Very thick materials will usually require a longer dwell time, to allow the greater mass to be heated, and to conduct the heat to the glue line. If pressure sensitive adhesives are utilized application can be accomplished by applying uniform pressure to the appliqué to adhere it to the garment. Adhesive activation can also be achieved through home ironing with a low melt activation film.

The foregoing results in a color-printed and/highlighted appliqué 1 as in FIG. 1 that gives an aesthetically-pleasing embossed or otherwise color-contrasted appearance.

It should now be apparent that the foregoing appliqués 1 and method for production thereof result in a transfer appliqué bearing a combination of screen and laser-engraved color-contrasted elements such as letters, logo graphics and numbers or other indicia, the laser-engraving accentuating the foregoing, all in a form that is easily applied to a garment or other textile so that all of the elements are precisely registered without using stitching or direct embroidery. Moreover, all of the printing, engraving and cutting may be controlled by common digital files, and so there is far less input required and all processing steps can be accomplished in-line, greatly increasing efficiency.

This has been a description of the present invention and, the preferred embodiment of the present invention, as well as various alternate embodiments of the present invention.

I claim:

1. A process for producing a thermal appliqué having a multi-color multi-layer 3D appearance, comprising the steps of:
   printing a graphic design on one side of an upper textile layer by depositing ink in a plurality of areas;
   adhering a lower base layer beneath said upper textile layer, said lower base layer further comprising a solid color substrate;
   laser-etching said upper textile layer to provide a plurality of surface relief features corresponding to said plurality of ink areas, said etching step further comprising the substeps of,
      using a laser to etch said surface relief features using a first pattern of cross-hatching lines that do not penetrate said upper textile layer,
      using said laser to etch said surface relief features using a second pattern of cross-hatching lines periodically intersecting said first pattern of cross-hatching lines and penetrating said upper textile layer at each intersection to reveal the color of said lower base layer there through; and
   adhering a first thermal adhesive layer beneath said lower base layer, said first thermal adhesive layer having a first melting point.

2. The process for producing a thermal appliquéaccording to claim 1, wherein said laser-etching step is accomplished using a galvanometric laser.

3. The process for producing a thermal appliquéaccording to claim 1, wherein said step of adhering a first thermal adhesive layer beneath said lower base layer further comprises laminating a urethane adhesive beneath said lower base layer.

4. The process for producing a thermal appliquéaccording to claim 1, wherein said step of adhering a lower base layer beneath said upper textile layer further comprising the substeps of applying a second thermal adhesive layer atop said base layer, registering said base layer in position beneath said upper textile layer, and melting said second thermal adhesive layer.

5. The process for producing a thermal appliquéaccording to claim 4, wherein said second thermal adhesive layer has a second melting point greater than the melting point of the first thermal adhesive layer.

6. A method for manufacturing a heat-applied appliqué-comprising the steps of:
   printing a colored design element on one side of an upper textile layer by depositing ink in a plurality of ink areas;
   registering a colored textile base layer to said upper textile layer with a heat sensitive adhesive layer sandwiched there between;
   adhering the upper textile layer to the base layer via the heat sensitive adhesive layer;
   coating a laminating layer underneath said base layer;
   engraving the colored design element and upper textile layer using a galvanometric laser system to provide a plurality of surface relief features corresponding to said plurality of ink areas, said engraving step further comprising the substeps of,
      using said galvanometric laser system to engrave said surface relief features using a first pattern of cross-hatching lines that do not penetrate said upper textile layer,
      using said galvanometric laser system to engrave said surface relief features using a second pattern of cross-hatching lines periodically intersecting said first pattern of cross-hatching lines and penetrating said upper textile layer at each intersection, said surface relief feature thereby exposing color-contrasted sections of the base layer amidst the ink design element;
   cutting through the ink design element, upper textile layer, base layer and laminating layer to cut peripherally around the appliqué.

* * * * *